US008991030B2

(12) United States Patent
Gugel et al.

(10) Patent No.: US 8,991,030 B2
(45) Date of Patent: Mar. 31, 2015

(54) FORMING METHOD FOR PROJECTION WELDING PROJECTIONS

(75) Inventors: Mark D. Gugel, Rochester Hills, MI (US); Bradley J. Blaski, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 432 days.

(21) Appl. No.: 13/441,016

(22) Filed: Apr. 6, 2012

(65) Prior Publication Data

US 2013/0263638 A1 Oct. 10, 2013

(51) Int. Cl.

| | |
|---|---|
| ***B21D 39/03*** | (2006.01) |
| ***B23K 31/02*** | (2006.01) |
| ***B23K 11/14*** | (2006.01) |
| ***B23P 11/00*** | (2006.01) |
| ***B21D 17/02*** | (2006.01) |
| ***B21D 22/02*** | (2006.01) |

(52) U.S. Cl.

CPC ................ *B21D 17/02* (2013.01); *B21D 22/02* (2013.01); *B23K 11/14* (2013.01)

USPC ............ 29/505; 29/465; 228/165; 228/173.3; 228/173.5; 228/173.6; 72/379.2; 72/414; 219/93

(58) Field of Classification Search

USPC ............. 29/897.2, 897.32, 432, 432.1, 432.2, 29/465, 466, 468, 469.5, 505, 238, 281.5, 29/283.5, 34 D, 34 R; 228/129, 130, 165, 228/166, 173.3, 173.5, 173.6, 174; 72/379.2, 379.6, 385, 414, 352; 219/93

See application file for complete search history.

(56) References Cited

U.S. PATENT DOCUMENTS

| | | | | |
|---|---|---|---|---|
| 4,850,214 | A * | 7/1989 | Opprecht et al. | 72/379.2 |
| 7,784,175 | B2 * | 8/2010 | Yagi et al. | 29/753 |
| 2002/0029472 | A1 * | 3/2002 | Takada | 29/861 |
| 2009/0302017 | A1 * | 12/2009 | Khakhalev et al. | 219/137 R |
| 2013/0105046 | A1 * | 5/2013 | Carlson et al. | 148/526 |

OTHER PUBLICATIONS

"Welding of Dissimilar Metals", Published Aug. 2006, Total Materia, pp. 1-3, accessed Aug. 7, 2014, http://www.keytometals.com/page.aspx?ID=CheckArticle&site=ktn&NM=152.*

* cited by examiner

*Primary Examiner* — Alexander P Tousakis
*Assistant Examiner* — Matthew P Travers

(57) ABSTRACT

A method for making a projection on a metal panel includes providing a lower die having a recess in the shape of the desired projection, laying the metal panel atop the lower die, positioning a filler material atop the metal panel, and lowering an upper die onto the filler material so that the filler material is forced into the metal panel and in turn forces the metal panel into the recess of the lower die whereby a projection is formed and the projection is filled with the filler material.

18 Claims, 3 Drawing Sheets

22 12 26 50 18 10 48 14

FORMING METHOD FOR PROJECTION WELDING PROJECTIONS

FIELD OF THE INVENTION

The present invention relates to the forming of projections on metal sheets for improving the electric resistance welding of the metal sheets.

BACKGROUND OF THE INVENTION

Metal panels are routinely welded together in an electric resistance welding process. Projections are formed on one of the metal sheets, and the sheets laid atop one another so that the projections of the one sheet are touching the other sheet. The weld electrodes are applied at the location of these projections so that the electrical current is focused at the projections. As weld current is applied, the projection is melted and fuses with the other metal sheet, thus welding the sheets together.

Projection welding of the more ductile and lightweight metals such as aluminum and magnesium can be difficult because the projections can collapse prematurely and adversely affect the weld process.

It would be desirable to provide a method for improving the projection welding of sheet metal panels by making projections of greater strength that will resist premature collapse under the force of the electrode applied thereto.

SUMMARY OF THE INVENTION

A method for making a projection on a metal panel includes providing a lower die having a recess in the shape of the desired projection, laying the metal panel atop the lower die, positioning a filler material atop the metal panel, lowering an upper die onto the filler material so that the filler material is forced into the metal panel and in turn forces the metal panel into the recess of the lower die whereby a projection is formed and the projection is filled with the filler material.

It should be understood that the detailed description and specific examples herein, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
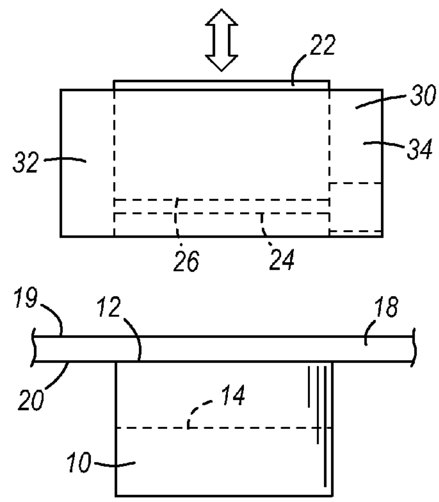
FIG. 1 is a side view of upper and lower dies for forming a projection in a sheet metal panel, with the upper die shown in a raised position.
Figure 2:
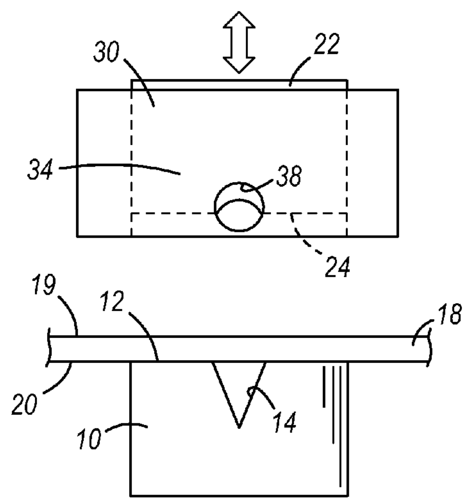
FIG. 2 is a front view of the upper and lower dies in FIG. 1.
Figure 3:
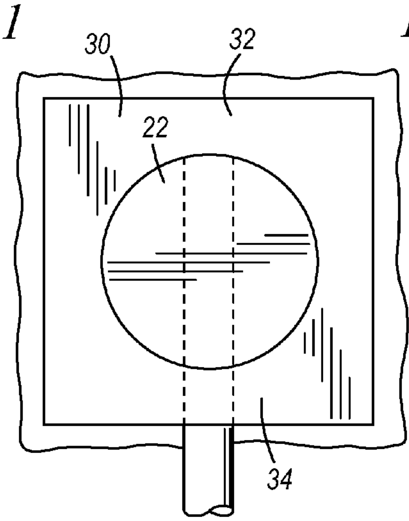
FIG. 3 is a top view of the upper and lower dies of FIG. 2.

Referring to FIGS. 1 and 2, a lower die 10 is rectangular in shape and has a top surface 12 with a V-shaped recess 14. A sheet metal panel 18 is placed atop the lower die 10. The sheet metal panel has a top surface 19 and a bottom surface 20.

An upper die 22 is cylindrical in shape and has a die surface 24 on the bottom thereof. The die surface 24 of the upper die 22 has a locating groove 26 therein which registers with and overlies the V-shaped recess 14 of the lower die 10. The upper die 22 is poised above the lower die 10. The lower die 10 is stationary and the upper die 22 is movable up and down relative to the lower die 10.

A locating fixture 30 surrounds the upper die 22 and moves up and down relative to upper die 22. In FIGS. 1 and 2, both the upper die 22 and the locating fixture 30 are raised up above the lower die 10 so that the sheet metal panel 18 can be easily placed upon the lower die 10. The locating fixture 30 has a first wall 32 and a second wall 34 that are diametrically opposed to each other and also lie at opposite ends of the V-shaped recess 14 of the lower die 10. The second wall 34 has a circular opening 38 for receiving a filler wire, as will be discussed hereinafter.

Figure 4:
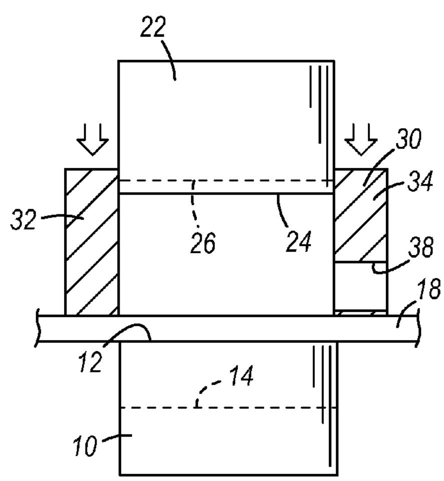
FIG. 4 is a side view similar to FIG. 1 but showing a locating fixture lowered onto sheet metal panel FIG. 1.
Figure 5:
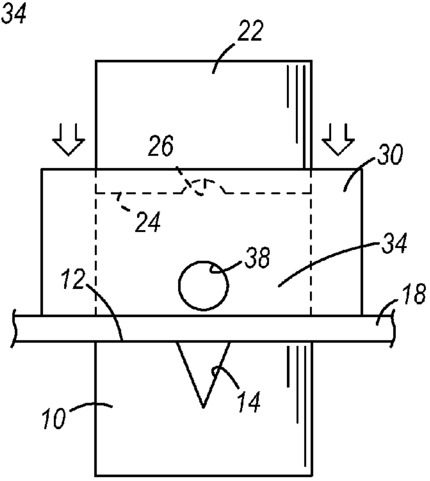
FIG. 5 is a front view similar to FIG. 2 but showing the locating fixture in its lowered position.

Referring to FIGS. 4 and 5, the locating fixture 30 has been lowered onto the sheet metal panel 18, while the upper die 22 remains poised above the lower die 10.

Figure 6:
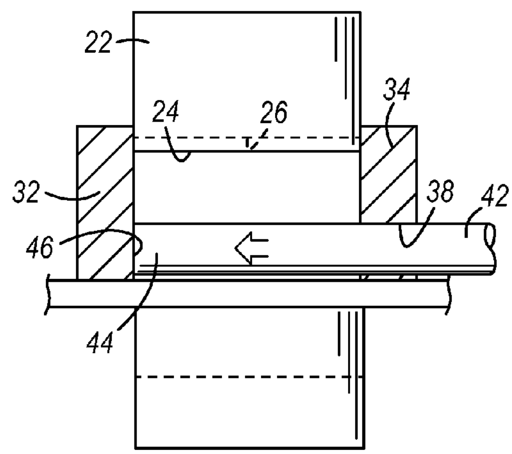
FIG. 6 is a side view similar to FIG. 4 but showing a wire fed into the locating fixture.
Figure 7:
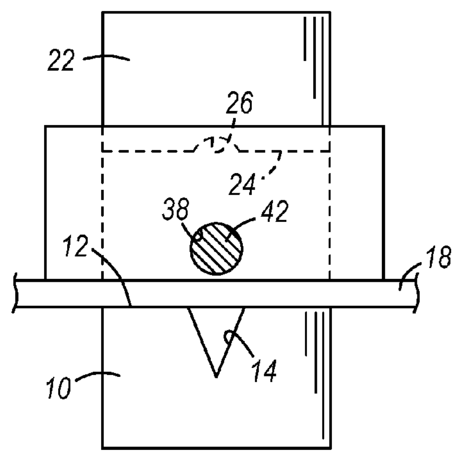
FIG. 7 is a front view similar to FIG. 5 but showing the wire fed into the locating fixture.

In FIGS. 6 and 7, it is seen that a filler wire 42 has been inserted through the circular opening 38 of second wall 34 of the locating fixture 30. The end 44 of the filler wire 42 engages with a locating stop 46 that is provided by the first wall 32 of the locating fixture 30. Thus, as seen in FIG. 7, the filler wire 42 is positioned atop the sheet metal panel 18 and overlies the V-shaped recess 14 of the lower die 10. The filler wire 42 can be a straight length of wire or can be uncoiled from a coil of wire.

Figure 8:
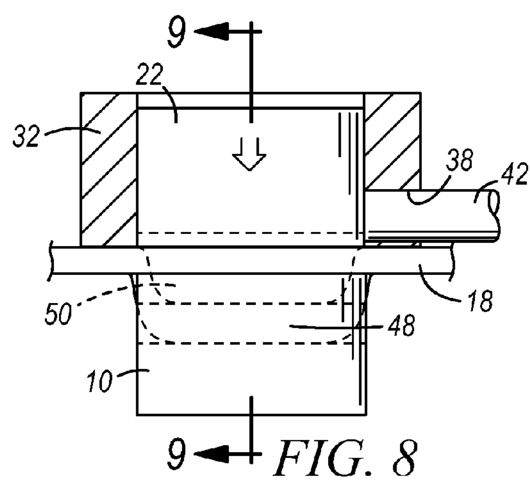
FIG. 8 is a side view similar to FIG. 6 but showing the upper die in the lowered position cutting off the wire and forcing the wire into the metal sheet.
Figure 9:
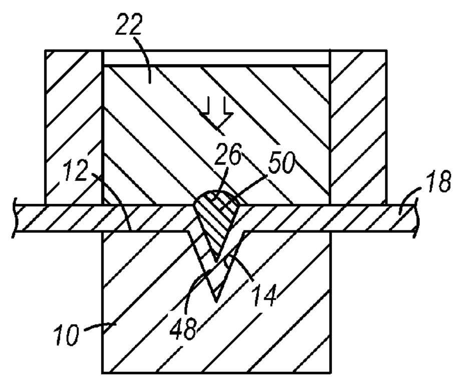
FIG. 9 is a front view from similar to FIG. 7 but showing the upper die in a lowered position.

In FIGS. 8 and 9, the upper die 22 is forcefully lowered onto the filler wire 42 and sheet metal panel 18. During the lowering of the upper die 22, the locating groove 26 of the upper die 22 receives the top surface of the filler wire 42 and progressively forces the filler wire 42 downwardly thereby forcing the sheet metal panel 18 down into the V-shaped recess 14. In addition, the lowering of the upper die 22 has cut off the filler wire 42. Thus, as seen in FIG. 9, a region of the sheet metal panel 18 has been displaced downwardly into the v-shaped recess 14, forming a V-shaped projection 48 that projects downward from the bottom of the sheet metal panel 18. The cutoff portion of the filler wire 42 has been deformed and has become a filler 50 that is filling the back side of the V-shaped projection 48.

Figure 10:
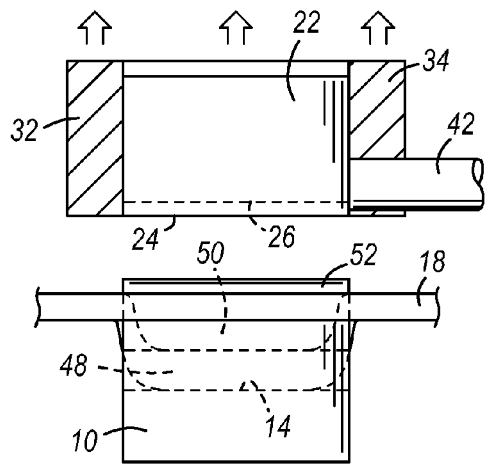
FIG. 10 is a side view similar to FIG. 8 but showing the upper die and the locating fixture raised above the sheet metal panel.
Figure 11:
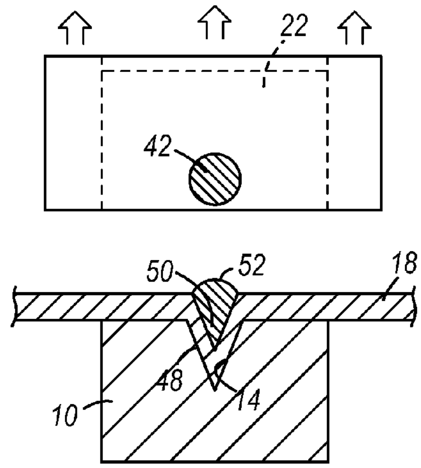
FIG. 11 is a front view similar to FIG. 9 but showing the upper die and the locating fixture raised above the sheet metal panel.

In FIGS. 10 and 11, both the upper die 22 and the locating fixture 30 is raised. The sheet metal panel 18 can be lifted off the lower die 10.

Figure 12:
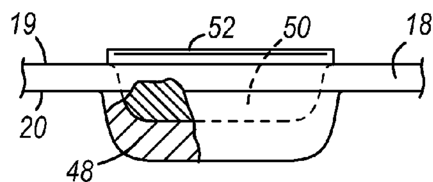
FIG. 12 is a side view showing the sheet metal panel removed from the lower die and a projection formed therein.
Figure 13:
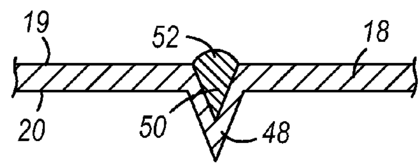
FIG. 13 is a front view showing the sheet metal panel removed from the lower die and the projection formed therein.
Figure 14:
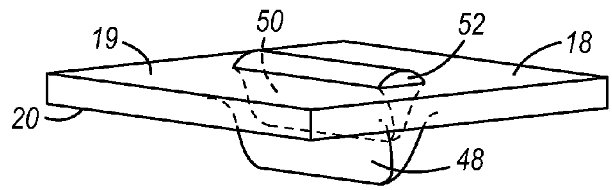
FIG. 14 is a perspective view showing the sheet metal panel with the projection formed therein.

In FIGS. 12, 13, and 14, the sheet metal panel 18 has been removed from the lower die 10. The V-shaped projection 48 projects from the bottom surface 20 of the sheet metal panel 18 and is filled with the filler 50 formed by the cutoff portion of the filler wire 42. A domed portion 52 of the filler 50 rises above the top surface 19 of the sheet metal panel 18. The domed portion 52 is an artifact of the locating groove 26 of the upper die 22.

Figure 15:
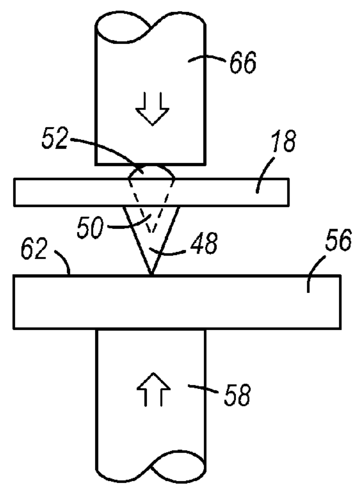
FIG. 15 is a elevation view showing an electric resistance weld set up for welding together two sheet metal panels.

FIG. 15 shows a typical electric resistance welding set up where a sheet metal panel 56 is supported by a lower electrode 58. The sheet metal panel 18 is laid atop the sheet metal panel 56. The V-shaped projection 48 engages the top surface 62 of the sheet metal panel 56 so that the V-shaped projection 48 provides the point of contact between the sheet metal panels 18 and 56. FIG. 14 also shows an upper electrode 66 that is lowered onto the sheet metal panel 18 and contacts with the domed portion 52 of the filler 50.

The electric resistance welding process is conducted by applying downward pressure on the upper electrode 66 while applying electric current between the electrodes 58 and 66. The projection 48, backed by the filler 50, will become softened and fused into the sheet metal panel 56 to thereby form the electric resistance weld between the sheet metal panels 18 and 56. During the downward pressure of the upper electrode 66, the presence of the filler 50 that is filling the otherwise empty backside of the V-shaped projection 48 will support the V-shaped projection 48 against premature collapse which might be detrimental to the formation of a high-quality electric resistance weld.

Figure 16:
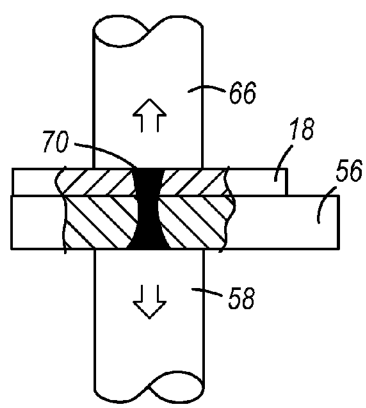
FIG. 16 is a view similar to FIG. 15 but showing the completed electric resistance weld process.

In FIG. 16 the upper electrode 66 has been fully lowered and it is seen that the projection 48 and the filler 50 have become fused into the sheet metal panels 18 and 56 providing a high-quality electric resistance weld nugget 70.

The aforedescribed process is particularly beneficial in the welding together of sheet metal panels made of aluminum or magnesium. Aluminum and magnesium panel are more ductile than steel panels and the customary hollow projections formed in the prior art are susceptible to premature collapse. We have found that by filling the back side of the otherwise empty projection with filler wire, as described herein, will supplement the strength of the projection and yet allow the collapse and formation of high quality welded.

Although the drawings herein show the example of a V-shaped projection, the projection can have a U-shaped or cross-section or other shapes known in the prior art. In addition, although we show the example of a filler wire having a traditional round cross-section. the filler wire can have other cross-sections if desired. In addition, the drawings herein show a semicircular locating groove 26 in the upper die which is useful for precisely locating the filler wire as it is being pressed downwardly into the sheet metal panel. In addition, as the best seen in FIG. 14, the presence of the locating groove 26 leaves a rounded or domed top surface of the filler wire in its deformed condition. The invention can be practiced without presence of the locating groove 26 in which case the filler 50 will lie flush with the top surface 19 of the sheet metal panel 18, without the formation of the domed portion 52.

The strength of the projection can be controlled by selection of material that is used for the filler wire 42. For example, the filler wire 42 can be of an alloy of metal that either the same or different from the alloy of the sheet metal panel 18, as desired to influence the melting point and resistance to collapse of the projection.

Although the drawings show just one projection formed on the sheet metal panel 18, in actual practice a plurality of such projections will be formed at spaced location on the sheet metal panel 18. In addition, the dimension of the projection is determined in part by the length of the filler wire 42 that is pressed into the metal sheet. If desired, the wire can be cutoff to a very short length so that resulting projection will be conical in shape rather than being of the more lengthy V-shape as shown in the drawings hereof. And, although the drawings show the use of a lengthy and continuous filler wire 42, either a straight length of wire or a wire that is unrolled from a coil, it will be understood that, as an alternative, short lengths or chunks of precut wire can be fed through the opening 38 for pressing into the sheet metal panel 18.

The drawings herein show the wire 42 as being fed into the locating fixture 34 after the locating fixture 34 has been lowered onto the sheet metal panel 18. However, as an alternative the filler wire 42 can be fed into the locating fixture 34 before the locating fixture 34 is lowered onto the sheet metal panel 18.

What is claimed is:

1. A method for making a projection on a metal panel comprising:

providing a lower die having a recess in the shape of the desired projection;

laying the metal panel atop the lower die;

positioning a filler material atop the metal panel, said positioning being provided by a locating fixture having a raised position above the metal panel and a lowered position lying atop the metal panel to position the filler material atop the metal panel;

lowering an upper die onto the filler material so that the filler material is forced into the metal panel and in turn forces the metal panel into the recess of the lower die whereby a projection is formed and the projection is filled with the filler material.

2. The method of claim 1 further comprising the filler material being a wire.

3. The method of claim 2 further comprising the filler material being a length of wire that is laid atop the metal panel.

4. The method of claim 3 further comprising the length of wire being cut to a precise length by the upper die upon lowering of the upper die.

5. The method of claim 1 further comprising the locating fixture having two walls, one wall having an opening for receiving the wire and the other wall having a stop surface engaged by an end of the wire.

6. The method of claim 1 further comprising the upper die having a locating groove formed in a lower die surface thereof and registering with the filler material laid atop the metal panel and registering with the groove in the lower die.

7. The method of claim 1 further comprising the filler material being selected of an alloy of metal that fuses into the metal of the metal panel upon application of a weld current thereto.

8. The method of claim 1 further comprising the recess in the lower die having a V-shaped cross-section for receiving the metal panel and defining the shape of the projection.

9. A method for making a projection on a metal panel comprising:

providing a lower die having a recess in the shape of the desired projection;

laying a metal panel atop the lower die;

lowering a locating fixture to atop the metal panel;

feeding a filler wire into the locating fixture so that the locating fixture will position the filler wire atop the metal panel with the filler wire registering with the recess of the lower die;

lowering an upper die onto the filler material so that the filler material is forced into the metal panel and in turn forces the metal panel into the recess of the lower die whereby a projection is formed into the recess and the filler wire is deformed to fill the projection.

10. The method of claim 9 further comprising feeding the filler wire into the locating fixture either before or after the locating fixture is lowered onto the metal panel.

11. The method of claim 9 further comprising the locating fixture having two walls, one wall having an opening for receiving the wire and the other wall having a stop surface engaged by an end of the wire.

12. The method of claim 9 further comprising the upper die having a locating groove formed in a lower die surface thereof and registering with the filler material laid atop the metal panel and also registering with the recess in the lower die.

13. The method of claim 12 further comprising the locating groove in the lower die surface of the upper die forming and forcing the filler material into the metal panel and forming a domed portion of filler material projecting from the top surface of the metal panel.

14. The method of claim 9 further comprising the filler material being selected of an alloy of metal that fuses into the metal of the metal panel upon application of a weld current thereto.

15. The method of claim 9 further comprising the filler wire being a continuous length of wire fed through an opening in a wall of the locating fixture and the lowering of the upper die cutting off a length of wire from the continuous length of wire.

16. A method for making a projection on a metal panel comprising:

providing a lower die having a recess in the shape of the desired projection;

laying a metal panel atop the lower die;

lowering a locating fixture to atop the metal panel, said locating fixture having a locating opening therein that overlies the recess of the lower die;

feeding a filler wire through the locating opening of the locating fixture so that the filler wire is positioned atop the metal panel with the filler wire registering with the recess of the lower die;

lowering an upper die onto the filler material so that upper die cuts the filler wire and forces the filler wire into the metal panel and in turn forces the metal panel into the recess of the lower die whereby a projection is formed into the recess and the filler wire is deformed to fill the projection.

17. The method of claim 16 further comprising the upper die having a locating groove formed in a lower die surface thereof and registering with the filler material laid atop the metal panel and also registering with the recess in the lower die.

18. The method of claim 16 further comprising the locating groove in the lower die surface of the upper die forming a forcing the filler material into the metal panel and forming a domed portion of filler material projecting from the top surface of the metal panel.

* * * * *